United States Patent
Jang et al.

(10) Patent No.: US 10,000,024 B2
(45) Date of Patent: Jun. 19, 2018

(54) APPARATUS AND METHOD FOR CONTROL OF THREE-DIMENSIONAL PRINTING

(71) Applicant: SAMSUNG SDS CO., LTD., Seoul (KR)

(72) Inventors: Sung-Ho Jang, Seoul (KR); In-Hyok Cha, Seoul (KR); Yong-Wook Jeong, Seoul (KR); Sang-Hoon Han, Seoul (KR); Kwang-Min Choi, Seoul (KR); Jae-Young Park, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 553 days.

(21) Appl. No.: 14/588,197

(22) Filed: Dec. 31, 2014

(65) Prior Publication Data

US 2016/0046074 A1    Feb. 18, 2016

(30) Foreign Application Priority Data

Aug. 14, 2014 (KR) .......................... 10-2014-0105822

(51) Int. Cl.
| | | |
|---|---|---|
| G06F 19/00 | (2018.01) | |
| B29C 67/00 | (2017.01) | |
| B33Y 50/02 | (2015.01) | |
| G05B 19/4099 | (2006.01) | |
| B29C 64/386 | (2017.01) | |

(52) U.S. Cl.
CPC ........ B29C 67/0088 (2013.01); B29C 64/386 (2017.08); B33Y 50/02 (2014.12); G05B 19/4099 (2013.01); G05B 2219/49008 (2013.01)

(58) Field of Classification Search
CPC ..................................................... B33Y 50/02
See application file for complete search history.

(56) References Cited

U.S. PATENT DOCUMENTS

| | | | |
|---|---|---|---|
| 2008/0111816 A1* | 5/2008 | Abraham | G06Q 30/06 345/420 |
| 2010/0191360 A1* | 7/2010 | Napadensky | B29C 67/0059 700/98 |
| 2012/0092724 A1 | 4/2012 | Pettis | |
| 2014/0046473 A1* | 2/2014 | Boynton | B29C 67/0088 700/119 |
| 2014/0129022 A1 | 5/2014 | Briscella et al. | |
| 2014/0214684 A1* | 7/2014 | Pell | G06Q 30/02 705/57 |
| 2014/0244017 A1* | 8/2014 | Freiwirth | B33Y 50/00 700/100 |
| 2014/0285844 A1* | 9/2014 | Oyama | G06K 15/1806 358/1.15 |
| 2015/0283763 A1* | 10/2015 | Chi | B29C 67/0088 700/119 |

* cited by examiner

*Primary Examiner* — Mohammad Ali
*Assistant Examiner* — Md Azad
(74) *Attorney, Agent, or Firm* — Sughrue Mion, PLLC

(57) ABSTRACT

An apparatus for controlling 3D printing includes an output determiner configured to determine, after generating a first control command to output a 3D object, whether an additional 3D object is able to be output through an output task for the 3D object, and a control command generator configured to generate a second control command to output a not-yet-output part of the 3D object and the additional 3D object if it is determined that the additional 3D object is able to be output through the output task.

25 Claims, 7 Drawing Sheets

APPARATUS AND METHOD FOR CONTROL OF THREE-DIMENSIONAL PRINTING

CROSS-REFERENCE TO RELATED APPLICATION

This application claims priority to and the benefit of Korean Patent Application No. 10-2014-0105822, filed on Aug. 14, 2014, the disclosure of which is incorporated herein by reference in its entirety.

BACKGROUND

1. Field

The present disclosure relates to an apparatus for controlling three-dimensional (3D) printing and a method thereof, and more particularly, to technology for controlling a task of outputting a 3D object from a 3D printer.

2. Discussion of Related Art

A three-dimensional (3D) printer is used to output a 3D object in a 3D shape by injecting and stacking a printing material, such as a solid, powder, or liquid polymer. When a request is made by a user to output a new 3D object during an output task of the conventional 3D printer, the requested 3D object is not output during the current output task. In order to output the newly requested 3D object, the output task in operation needs to be canceled or completed. In this case, an interrupt caused by canceling the task or a delay caused by waiting for completion of the task may occur. In addition, the 3D printing technology performed by stacking a printing material is costly to implement and has a lower processing speed than a cutting process. Accordingly, there is a need for technology for producing as high an output as possible in a single output process.

SUMMARY

The present disclosure is directed to an improved method of controlling a three-dimensional (3D) printer for outputting a 3D object by stacking a material.

According to an aspect of the present disclosure, there is provided an apparatus, intended for use in controlling three dimensional (3D) printing, including: an output determiner configured to make an additional output determination, after generating a first control command to output a first 3D object as part of a current output task, as to whether a second 3D object can be included as part of the current output task; and a control command generator configured to generate a second control command to output a not-yet-output part of the first 3D object and the second 3D object when the additional output determination is affirmative; and one or more hardware processors implementing the output determiner and the control command generator.

The output determiner is further configured to make the additional output determination based on first modeling information about the first 3D object and second modeling information about the second 3D object.

The output determiner is further configured to obtain the first modeling information based on a first user request for the first 3D object before initiating the current output task; and the control command generator is configured to generate the first control command based on the first modeling information.

The first control command includes first per-layer sub-control commands adapted to cause a 3D printer to output the first 3D object by stacking a material; and the second control command includes second per-layer sub-control commands adapted to cause the 3D printer to output the not-yet-output part of the first 3D object and the second 3D object by stacking the material.

According to an example embodiment, there is further included a control command transmitter configured to sequentially transmit the per-layer sub-control commands to the 3D printer to effect the current output task, and to stop sequentially transmitting the first per-layer sub-control commands when transmitting the second per-layer sub-control commands.

When the additional output determination is affirmative, the output determiner is further configured to make another additional output determination with respect to whether a third 3D object can be included as part of the current output task for the first 3D object and the second 3D object.

The output determiner is further configured such that, when the additional output determination is affirmative, the output determiner generates unified modeling information based on the first modeling information and the second modeling information; and the control command generator is further configured to generate the second control command based on the unified modeling information.

The first 3D object is output within a build space of a 3D printer in accordance with the current output task; and the output determiner is further configured to identify a remaining space for the current output task, within the build space, based on the first modeling information, and to base the additional output determination at least in part on a remaining space determination as to whether the second 3D object can be fit into the remaining space.

The output determiner is further configured make the remaining space determination taking into account a total volume of one or more bounding boxes covering the second 3D object, based on the second modeling information, and a volume of the remaining space, and when the total volume of the one or more bounding boxes is smaller than the volume of the remaining space, the remaining space determination is affirmative.

The unified modeling information represents both the not-yet-output part of the first 3D object in the build space and the second 3D object in the remaining space.

The first modeling information, the second modeling information, and the unified modeling information are each provided as separate output files in a common 3D print format.

The output determiner is further configured to store the second modeling information in a queue for output in an output task subsequent to the current output task when the additional output determination is not affirmative.

According to an example embodiment, there is further included a control command transmitter configured to transmit the second control command during the current output task, instead of the first control command.

According to an example embodiment, there is further included a printer monitor configured to obtain status information about a 3D printer performing the current output task, and to transmit the status information to the output determiner. The output determiner is further configured to detect whether the current output task is in progress based on the status information, and to make the additional output determination after it is detected that the current output task is in progress.

According to another aspect of the present disclosure, there is provided a method of controlling three dimensional (3D) printing, including: making an additional output determination, after generating a first control command to output a first 3D object as part of a current output task, as to whether a second 3D object can be included as part of the current output task; and generating a second control command to output a not-yet-output part of the first 3D object and the second 3D object when the additional output determination is affirmative. The making of the additional output determination and the generating of the second control command are implemented using one or more hardware processors.

The making of the additional output determination is based on first modeling information about the first 3D object and second modeling information about the second 3D object.

An example embodiment further includes obtaining the first modeling information based on a first user request for the first 3D object before initiating the current output task; and generating the first control command based on the first modeling information.

According to an example embodiment, the first control command includes first per-layer sub-control commands adapted to cause a 3D printer to output the first 3D object by stacking a material; and the second control command includes second per-layer sub-control commands adapted to cause the 3D printer to output the not-yet-output part of the first 3D object and the second 3D object by stacking the material.

An example embodiment also includes sequentially transmitting the per-layer sub-control commands to the 3D printer to effect the current output task; and stopping sequentially transmitting the first per-layer sub-control commands when transmitting the second per-layer sub-control commands.

An example embodiment also includes, when the additional output determination is affirmative, making another additional output determination with respect to whether a third 3D object can be included as part of the current output task for the first 3D object and the second 3D object.

According to an example embodiment, there is further included, when the additional output determination is affirmative, generating unified modeling information based on the first modeling information and the second modeling information, and generating the second control command based on the unified modeling information.

According to an example embodiment, there is further included: outputting the first 3D object within a build space of a 3D printer in accordance with the current output task; identifying a remaining space for the current output task, within the build space, based on the first modeling information; and basing the additional output determination at least in part on a remaining space determination as to whether the second 3D object can be fit into the remaining space.

According to an example embodiment, there is further included making the remaining space determination taking into account: a total volume of one or more bounding boxes covering the second 3D object, calculated based on the second modeling information; and a comparison of the total volume of the one or more bounding boxes with a volume of the remaining space. When the total volume of the one or more bounding boxes is smaller than the volume of the remaining space, the remaining space determination is affirmative.

The unified modeling information represents the not-yet-output part in the build space and the additional 3D object in the remaining space.

The first modeling information, the second modeling information, and the unified modeling information are each provided as separate output files in a common 3D print format.

According to an example embodiment, there is further included storing the second modeling information in a queue for output in an output task subsequent to the current output task when the additional output determination is not affirmative.

According to an example embodiment, there is further included transmitting, during the current output task, the second control command instead of the first control command.

According to an example embodiment, there is further included: obtaining status information about a 3D printer performing the current output task; detecting whether the current output task is in progress based on the status information; and making the additional output determination after detecting that the current output task is in progress.

According to another aspect of the disclosure, there is also provided a computer program product including a non-transitory computer readable medium and program instructions adapted to enable a hardware processor to implement operations including: making an additional output determination, after generating a first control command to output a first 3D object as part of a current output task, as to whether a second 3D object can be included as part of the current output task; and generating a second control command to output a not-yet-output part of the first 3D object and the second 3D object when the additional output determination is affirmative.

BRIEF DESCRIPTION OF THE DRAWINGS

The above and other objects, features, and advantages of the present disclosure will become more apparent to those of ordinary skill in the art by describing in detail example embodiments thereof with reference to the accompanying drawings, in which.

DETAILED DESCRIPTION OF EXAMPLE EMBODIMENTS

Example embodiments of the present disclosure will be described in detail below with reference to the accompanying drawings. The embodiments are provided to assist those skilled in the art in understanding the present disclosure by way of examples. It will, however, be appreciated by the reader that various modifications can be made to the example embodiments without departing in spirit or scope from the inventive concepts disclosed herein.

Since the reader of the present disclosure is expected to be one already familiar with this field, various details already understood by such a person are omitted. The terminology used herein is defined in consideration of its function in the present disclosure, and may vary with an intention or custom of a user or operator. Accordingly, the meaning of terms should be determined based on the overall context of the specification unless specifically given.

The terminology used herein is for the purpose of describing particular embodiments only and is not intended to limit the claims. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Figure 1:
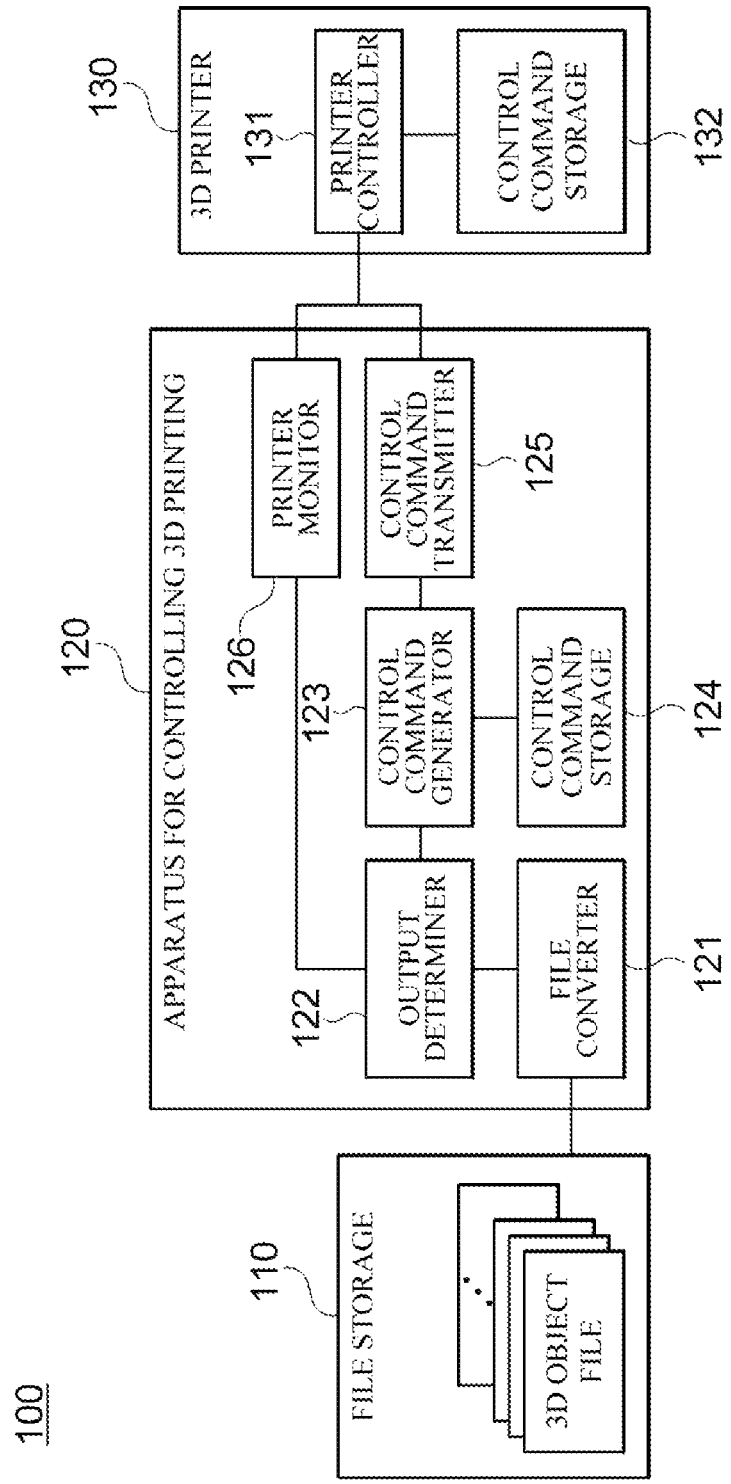
FIG. 1 is a block diagram illustrating a three-dimensional (3D) printing system according to an example embodiment of the present disclosure.

Turning now to FIG. 1, there is shown a block diagram schematically illustrating a three-dimensional (3D) printing system according to an example embodiment of the present disclosure. Referring to FIG. 1, a 3D printing system 100 according to an example embodiment of the present disclosure includes a file storage 110, an apparatus for controlling 3D printing 120, and a 3D printer 130.

The file storage 110 is configured to store 3D object files providing modeling information about 3D objects. In example embodiments, the file storage 110 stores 3D object files having various formats, such as CAD (Computer Aided Design), DAE (Digital Asset Exchange), OBJ (OBJect), X3D (eXtensible 3D), and WRL (WoRLd). It should be understood that such a format is for illustrative purposes only, and a 3D object file having another format, in another example embodiment, is stored in the file storage 110.

According to example embodiments of the present disclosure, the file storage 110 includes a computer readable storage medium (for example, a hard disk and/or a memory) in a computing device (for example, a host computer connected to the 3D printer 130 or a computer in which the apparatus 120 is implemented), a local storage such as a direct-attached storage (DAS), a network storage such as a network-attached storage (NAS) or a storage area network (SAN), and/or a cloud storage. A user of the 3D printing system 100 generates a desired 3D object file by using 3D modeling tools, such as a 3D scanner, a CAD program, or a 3D image converting program, and stores the generated 3D object file in the file storage 110, or downloads a 3D object file via a network to the file storage 110 from a 3D content market (for example, Thingiverse), a cloud-based 3D printing service (for example, i.materialise), or another 3D object file sharing system.

The user selects one or more 3D object files stored in the file storage 110, and requests output of one or more 3D objects represented by the one or more 3D object files. The apparatus 120 receives the request from the user and obtains the selected one or more 3D object files from the file storage 110. In particular, according to example embodiments of the present disclosure, a 3D-shaped physical product including the one or more 3D objects for which output is requested is output through a single output task under the control of the apparatus 120. When the user additionally selects another 3D object file stored in the file storage 110 during the output task, the apparatus 120 allows the 3D printer 130 to output another 3D object represented by the additionally selected 3D object file through the output task, if possible. For convenience of description, hereinafter, a task space in which the 3D printer 130 manufactures the product (for example, a space on a printer bed of the 3D printer 130) is referred to as a build space of the 3D printer 130. That is, no product of the 3D printer 130 is output outside the build space. In addition, if the 3D object file stored in the file storage 110 is provided as a single file, it is assumed that the file always represents a 3D object that is able to be output in the build space.

For example, the apparatus 120 is configured to perform the following control operations. The apparatus 120 receives one or more 3D object files selected by the user from the file storage 110. In response to the user's selection, the apparatus 120 obtains modeling information about 3D objects represented by the respective 3D object files (hereinafter referred to as "the requested 3D object"). In addition, the apparatus 120 identifies at least one 3D object, among the requested one or more 3D objects, that is able to be output in the build space of the 3D printer 130 during a single output task. The identifying, according to example embodiments, is performed using the obtained modeling information. In addition, the apparatus 120 generates a control command for outputting the identified at least one 3D object through the 3D printer 130. The apparatus 120, in example embodiments, generates the control command based on modeling information about the identified at least one 3D object. Thereafter, the apparatus 120 transmits the generated control command to the 3D printer 130. According to example embodiments of the present disclosure, the apparatus 120 divides the generated control command into a plurality of sub-control commands corresponding to a plurality of material layers. Thereafter, the apparatus 120 sequentially may transmits the plurality of sub-control commands during an output task performed by the 3D printer 130.

The 3D printer 130 manufactures a 3D-shaped product from a printing material (for example, a solid, a powder, or a liquid such as a liquid phase polymer) by performing an output task according to the received control command. Referring to FIG. 1, the 3D printer 130 includes a printer controller 131 and a control command storage 132. The printer controller 131 stores a control command received by the 3D printer 130 in the control command storage 132, and reads the control command from the control command storage 132 to control the operation of the 3D printer 130.

In an example embodiment, the 3D printer 130 receives per-layer sub-commands, and performs an output task by stacking material layers according to the received per-layer sub-control commands. In particular, while a material layer is being output according to a sub-control command for a current layer, transmission of a sub-control command for the following layer in advance enables the 3D printer 130 to smoothly perform the output task. In addition, according to an example embodiment, when the output of a material layer is complete, the printer controller 131 deletes the sub-control command for the current layer from the control command storage 132 to improve the efficiency of memory use of the 3D printer 130. In another example embodiment, the printer controller 131 generates status information by monitoring the progress of the output task in units of layers, and transmits the generated status information to a printer monitor 126 upon request from the printer monitor 126 or, in another example embodiment, at a certain point of time (for example, when a certain event occurs or periodically).

Example Implementation of the Apparatus for Controlling 3D Printing 120

As shown in FIG. 1, the apparatus for controlling 3D printing 120 includes a file converter 121, an output determiner 122, a control command generator 123, a control command storage 124, a control command transmitter 125, and the printer monitor 126. According to example embodiments of the present disclosure, the apparatus 120 is implemented or included in a computing device such as a host computer connected to the 3D printer 130 through a serial port or a parallel port (for example, a computing device 610 shown in FIG. 6) or is implemented or included in a computing device such as a server computer connected to the 3D printer 130 through a network (for example, a computing device 710 shown in FIG. 7). According to example embodiments of the present disclosure, the apparatus 120 is implemented or included in the 3D printer 130. Hereinafter, operations of each component of the apparatus 120 will be described in more detail.

File Converter 121

As described above, in an example embodiment, a user selects one or more 3D object files stored in the file storage 110 (for example, 3D object files having file formats of CAD, DAE, OBJ, X3D, or WRL) and requests the output of one or more 3D objects represented by the selected one or more 3D object files. The file converter 121 receives the user's request, and receives the selected one or more 3D object files from the file storage 110. In addition, the file converter 121 converts the received 3D object files into output files having a common format supported by the 3D printer 130, for example, an STL (STereoLithography) file or an AMF (Additive Manufacturing File) file. In addition, the file converter 121 provides the output determiner 122 with the one or more converted files. For the sake of convenience of description, it is assumed, without limitation, that the file converter 121 provides the output determiner 122 with one or more STL files.

Output Determiner 122

The output determiner 122 receives one or more STL files from the file converter 121, and determines a 3D object that is to be output through the 3D printer 130 among one or more 3D objects represented by the one or more STL files, that is, among the requested one or more 3D objects. To this end, the output determiner 122 identifies at least one 3D object that is able to be output in a build space of the 3D printer 130 through a single output task of the 3D printer 130 among the requested one or more 3D objects. In addition, the output determiner 122 provides the control command generator 123 with modeling information about the identified 3D object. According to example embodiments of the present disclosure, the modeling information is transmitted to the control command generator 123 as a single output file in an STL format.

In detail, the output determiner 122 receives status information of the 3D printer 130 from the printer monitor 126, and based on the status information, determines whether the 3D printer 130 is idle.

If it is determined that the 3D printer is idle, the output determiner 122 identifies at least one 3D object that is able to be output in the build space of the 3D printer 130 during a single output task among the requested one or more 3D objects. The identifying includes selecting at least one 3D object that is able to be simultaneously disposed in the build space according to a predetermined requirement. In example embodiments, the requirement includes disposing as many 3D objects in the build space as possible, disposing 3D objects in the build space at the highest density, and/or disposing a 3D object having a higher priority in the build space prior to a 3D object having a lower priority. Thereafter, the output determiner 122 checks the number of selected 3D objects. If the number of selected 3D objects is 1, the output determiner 122 transmits, e.g., an STL file representing the 3D object to the control command generator 123. If the number of selected 3D objects is 2 or more, the output determiner 122 generates a single output file in an STL format by merging STL files representing the 3D objects, and transmits the generated STL file to the control command generator 123. The determination performed when the output determiner determines whether an additional 3D object can be accommodated as part of the current output task may be referred to as an additional output determination.

If there is a 3D object that is unable to be disposed in the build space together with the one or more 3D objects selected as described above among the requested 3D objects, the output determiner 122 may queues the STL file representing the 3D object that is unable to be disposed in a queue (not shown), such that the STL file can be used in a subsequent output task of the 3D printer 130. According to an example embodiment, only a pointer to the STL file is stored in the queue. In an example embodiment, 3D objects represented by STL files stored in a queue have a priority order according to the order in which the STL files are stored in the queue. In another example embodiment, all of the 3D objects in queue have priorities higher than 3D objects newly requested in a subsequent output task of the 3D printer 130. Accordingly, the output determiner 122 selects a 3D object that is able to be disposed in the build space of the 3D printer 130 by using the priorities for the following output task.

Control Command Generator 123, Control Command Storage 124, and Control Command Transmitter 125

The control command generator 123 receives a single output file in an STL format from the output determiner 122. The control command generator 123 generates a control command for outputting one or more 3D objects based on the STL file. The generated control command is stored in the control command storage 124. The control command storage 124 associates the control command with a unique ID to manage the control command, in an example embodiment. The control command generator 123 transmits a control command stored in the control command storage 124 to the control command transmitter 125 when necessary, according to an example embodiment. Thereafter, the control command transmitter 125 transmits the transmitted control command to the 3D printer 130. To this end, the control command transmitter 125 has a communication protocol supporting a serial connection, a parallel connection, and/or a network connection with the 3D printer 130. The 3D printer 130 performs an output task by manipulating a header and/or a print bed of the 3D printer 130 by using the control command. Accordingly, at least one 3D object identified by the output determiner 122 is output in the build space of the 3D printer 130 during the output task.

According to example embodiments of the present disclosure, the control command generator 123 calculates a set of per-layer data by slicing polygon data in the received STL file (for example, according to a predetermined layer thickness set by a user of the 3D printing system 100 or set by the apparatus 120). The control command generator 123 generates a control command to specify the path for stacking a material, the speed at which the material is stacked, and/or the thickness of a material layer in the output task of the 3D printer 130, by use of the set of per-layer data. According to the control command, the 3D printer 130 stacks the material layer by layer to output the identified at least one 3D object.

In addition, the control command includes a plurality of sub-control commands corresponding to a plurality of material layers, to allow the 3D printer 130 to perform the output task by stacking the material layers. For example, the control command generator 123 divides the control command into a plurality of per-layer sub-control commands. The control command generator 123 stores the plurality of per-layer sub-control commands in the control command storage 124. The control command storage 124 associates the per-layer sub-control commands with unique IDs to manage the per-layer sub-control commands, according to example embodiments. The control command generator 123 transmits the per-layer sub-control commands stored in the control command storage 124 to the control command transmitter 125. The control command transmitter 125 transmits the transmitted per-layer sub-control commands to the 3D printer 130.

According to example embodiments of the present disclosure, the control command transmitter 125 sequentially transmits the per-layer sub-control commands to the 3D printer 130, one by one, based on the IDs of the per-layer sub-control commands. For example, the control command transmitter 125 determines whether an output task of the 3D printer 130 is initiated and being performed, for example, based on status information of the 3D printer 130. If an output task of the 3D printer is not being performed, the control command transmitter 125 transmits a per-layer sub-control command corresponding to a layer that is to be output first from the 3D printer 130. The control command transmitter 125 stores an index of the corresponding layer or an ID of the corresponding sub-control command, to check the current output position. If an output task of the 3D printer is being performed, the control command transmitter 125 checks an index of the layer being currently output or an ID of a sub-control command corresponding to the layer. Thereafter, the control command transmitter 125 transmits a sub-control command corresponding to the following layer to the 3D printer 130. Similarly, the control command transmitter 125 stores an index of the corresponding layer or an ID of the corresponding sub-control command, to check the current output position. The control command transmitter 125 repeats the above operations until all of the sub-control commands are transmitted.

As described above, the method of sequentially transmitting sub-control commands to the 3D printer 130, one by one, instead of collectively transmitting output files (for example, STL files) or machine language codes to the 3D printer 130 for an output task allows the output task of the 3D printer 130 to be more effectively controlled.

Printer Monitor 126

The printer monitor 126 obtains status information of the 3D printer 130 by interacting with the printer controller 131 included in the 3D printer 130. The status information, according to example embodiments, includes the operation status of the 3D printer 130 (for example, 'idle' or 'printing'), output task information, output progress status, an index indicating a layer being output (for example, an ID of a sub-control command corresponding to a layer being output), and/or the amount of remaining printing material.

When Output of a 3D Object is Newly Requested During an Output Task

As described above, the 3D printer 130 performs an output task for outputting at least one 3D object according to a control command. The following description will be made of the operation of the apparatus 120 according to an example embodiment, when the output of an additional 3D object is requested during the time that an output task is already being performed (i.e., after the control command is generated), with reference to FIGS. 1 and 2. However, the number, shapes, and/or other features of 3D objects output from the 3D printer 130, the output scheme of the 3D printer 130, the build space of the 3D printer 130, the number of layers in the build space of the 3D printer 130, and/or other features of the build space of the 3D printer 130, and features such as the scheme of representing modeling information about 3D objects (for example, a file format of a 3D object file), and the operation of the apparatus 120 are for illustrative purposes only.

Figure 2:
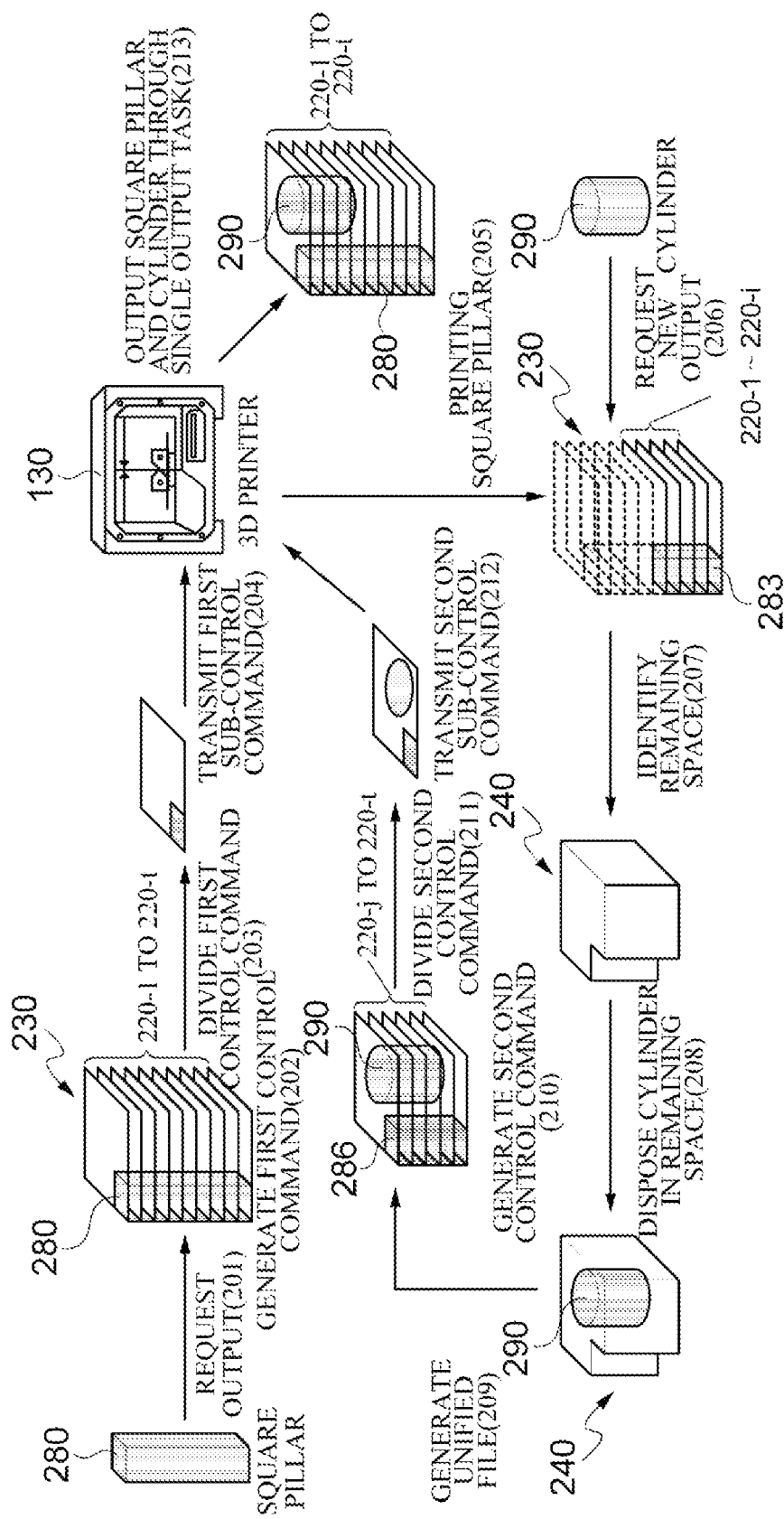
FIG. 2 is a diagram illustrating operations of a 3D printing controlling apparatus according to an example embodiment of the present disclosure.

First, for the sake of convenience of the description, it is assumed that the 3D printer 130 is outputting a 3D object 280 in the form of a square pillar as shown in FIG. 2. As described above, when a user requests output of the 3D object 280 by selecting a 3D object file representing the 3D object 280 (Request Output 201), the file converter 121 converts the selected 3D object file into an STL file and then transmits the converted STL file to the output determiner 122. The STL file still includes modeling information about the 3D object 280. Accordingly, the output determiner 122 obtains the modeling information about the 3D object 280 from the STL file following the user's request 201 for outputting the 3D object 280. Further, in this case, because the 3D object 280 is (at least for now) the only 3D object requested by the current user, the output determiner 122 transmits the received STL file to the control command generator 123 as it is. Hereinafter, the STL file for the square pillar will be referred to as a first STL file. The control command generator 123 generates a first control command allowing the 3D printer 130 to output the 3D object 280 in a build space 230 of the 3D printer 130 (Generate First Control Command 202 in FIG. 2) by using the first STL file. In particular, as shown in FIG. 2, the control command generator 123 divides the first control command into a plurality of first sub-control commands corresponding to each of a plurality of layers 220-1 to 220-t (Divide First Control Command 203). The control command transmitter 125 sequentially transmits the first sub-control commands to the 3D printer 130 one by one (Transmit First Sub-Control Command 204). The 3D printer 130 stacks a material to output the 3D object 280 according to the received sub-control commands (205). For example, when first sub-control commands corresponding to layers 220-1 to 220-i have been transmitted to the 3D printer 130 so far, the 3D printer 130 outputs a part 283 of the 3D object 280.

Thereafter, the user requests output of an additional 3D object 290 in the form of a cylinder, as shown in FIG. 2, by selecting a 3D object file including modeling information of the additional 3D object 290 (Request New Output 206). The file converter 121 receives the selected 3D object file from the file storage 110, and converts the received 3D object file into a second STL file (i.e., a STL file corresponding to the cylinder 290). Thereafter, the output determiner 122 receives the second STL file from the file converter 121. As described above, the output determiner 122 obtains modeling information about the 3D object 290 from the second STL file upon the user's request for outputting the 3D object 290. In response to the reception of the second STL file, the output determiner 122 determines whether the 3D printer 130 is currently performing an output task. For example, the output determiner 122 receives status information on the 3D printer 130 from the printer monitor 126, and uses the received status information to perform the determination.

Thereafter, the output determiner 122 determines whether the 3D object 290 is able to be output as an adjunct to the current output task for the 3D object 280. The determination is performed based on the first STL file which includes the modeling information about the 3D object 280 and the second STL file which includes the modeling information about the 3D object 290. The determination takes into account not only the first and second STL files, but also some criterion such as a spatial relationship of the object being printed and the object that is a candidate to be added to the current printing operation. For example, the output determiner 122 identifies a remaining space 240 for the current output task in the build space 230 based on the first STL file (Identify Remaining Space 207). The remaining space 240 is identified by excluding a space that is unable to be used for the current output task (for example, a space taken by layers (220-1 to 220-i) that have already been used for outputting the 3D object 280 and taken by a not-yet-output part 286 of the 3D object 280) from the build space 230. In addition, the output determiner 122 determines whether the 3D object 290 is able to be output in the remaining space 240 during the current output task based on the second STL file (Dispose Cylinder in Remaining Space 208). According to example embodiments of the present disclosure, the output determiner 122 calculates a total volume of one or more bounding boxes covering the 3D object 290 based on the second STL file, and compares the total volume with a volume of the remaining space 240. When the total volume is equal to or smaller than the volume of the remaining space 240, the output determiner 122 determines whether the 3D object 290 is able to be output in the remaining space 240 during the current output task. This determination depends on whether the 3D object 290 is able to be disposed in the one or more bounding boxes (i.e., whether the output would fit in the remaining space). In addition, the output determiner 122 selects the disposition of the 3D object 290 using not only the remaining space 240 but also state information such as the remaining amount of printing material. The determination as to whether the additional object can be fit into the remaining space, either in one piece or more than one piece, may be referred to as a remaining space determination.

If the 3D object 290 is able to be disposed in the remaining space 240 as shown in FIG. 2, the 3D object 290 is able to be output in the remaining space 240 during the current output task. In this case, the output determiner 122 generates a new single STL file (hereinafter referred to as a unified STL file) by merging the first STL file and the second STL file (Generate Unified File 209). The unified STL file includes unified modeling information representing the not-yet-output part of the 3D object 280 in the build space of the 3D printer 130 as well as the 3D object 290 in the remaining space. As described above, the first STL file, which is the existing output file, is replaced with the unified STL file. In other words, instead of continuing to output based on only the first STL file, output is based instead on the unified STL file. Thereafter, the output determiner 122 transmits the generated unified STL file to the control command generator 123.

The control command generator 123 generates a second control command for outputting the not-yet-output part 286 of the 3D object 280 together with the 3D object 290 based on the unified STL file (Generate Second Control Command 210). The generated second control command allows the 3D printer 130 to output the not-yet-output part 286 of the 3D object 280 together with the 3D object 290. In particular, as shown in FIG. 2, the control command generator 123 divides the second control command into a plurality of second sub-control commands corresponding to each of a plurality of layers 220-j to 220-t (Divide Second Control Command 211). The control command transmitter 125 sequentially transmits the second sub-control commands to the 3D printer 130 one by one (Transmit Second Sub-Control Command 212). In particular, the control command transmitter 125 stops sequentially transmitting the first sub-control commands while starting to sequentially transmit the second sub-control commands. That is, for the plurality of layers 220-j to 220-t that have not been used for the current output task yet, the second sub-control commands is applied instead of the existing first sub-control commands. The 3D printer 130 keeps stacking the material to output the not-yet-output part 286 of the 3D object 280 together with the 3D object 290 according to the received second sub-control commands. Finally, the 3D printer 130 outputs the 3D object 280 and the 3D object 290 in the build space 230 through a single output task (Output Square Pillar and Cylinder Through Single Output Task 213).

On the other hand, suppose that the 3D object 290 is unable to be disposed in the remaining space 240. In such a situation, the 3D object 290 is unable to be output in the remaining space 240 during the current output task and must wait for a subsequent output task. In this case, the output determiner 122 stores the second STL file in a queue. According to example embodiments of the present disclosure, the output determiner 122 includes such a queue. The queue may be implemented, according to example embodiments, in file storage 110, or any other storage in apparatus 120 or printer 130.

As described above, the 3D printing system 100 according to the example embodiment of the present disclosure changes a control command so as to control the output task of the 3D printer 130 by recognizing the progress of the output task (for example, the number of layers that have been stacked through the output task) even if a new request for output is received during the execution output task of the 3D printer 130, so that the 3D printer 130 outputs an additional 3D object without stopping the output task that is being performed. Accordingly, the productivity of the 3D printer 130 is effectively improved.

Figure 3:
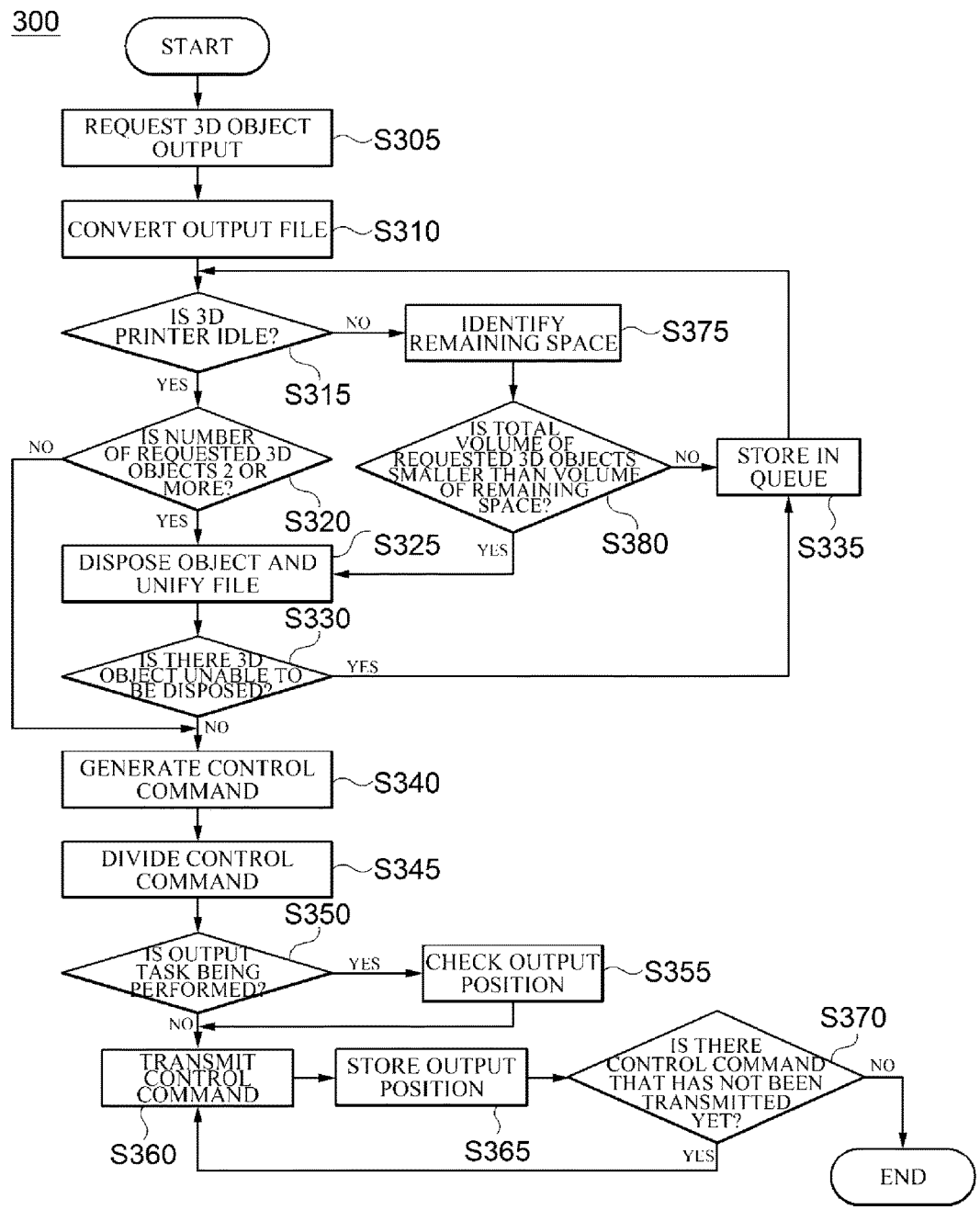
FIG. 3 is a diagram illustrating a process of controlling 3D printing according to an example embodiment of the present disclosure.

Hereinafter, referring to FIG. 3, a process of controlling 3D printing 300 according to an example embodiment of the present disclosure will be described. In an example embodiment, the process of controlling 3D printing 300 is performed by the apparatus 120 for controlling 3D printing.

After a start operation, the process 300 performs operation S305. In operation S305, a request for outputting one or more 3D objects is received. In response to the request, one or more 3D object files representing the requested one or more objects are provided, and each 3D object file is converted into an output file of a common format supported by a 3D printer, for example, the 3D printer 130 (S310). Thereafter, it is determined whether the 3D printer is idle based on the status information of the 3D printer (S315).

If it is determined that the 3D printer is not performing an output task (i.e., is "idle"), the number of 3D objects for which output is requested is checked (S320).

If the number is found to be 1, a control command is generated based on an output file (S340).

If the number is found to be 2 or more, 3D objects that are able to be simultaneously disposed in a build space of the 3D printer are identified among the requested 3D objects, and output files representing the identified 3D objects are unified into a single output file (S325). In operation S330, it is determined whether there is a 3D object that is not identified as being able to be disposed in the build space of the 3D printer. If there is a 3D object that is unable to be disposed in the build space of the 3D printer together with the identified 3D object or objects, an output file (or a pointer) representing the 3D object that is unable to be disposed in the build space is stored in a queue (S335). The output file stored in the queue is set for output in a subsequent output task of the 3D printer. When there is a 3D object that is unable to be disposed in the build space of the 3D printer, a control command is generated based on a single output file (S340).

In operation S345, the generated control command is divided into a plurality of per-layer sub-control commands. The sub-control commands are sequentially transmitted to the 3D printer one by one.

In operation S350, it is determined whether an output task of the 3D printer has already been initiated and is being performed.

If an output task of the 3D printer is not being performed, a sub-control command corresponding to a layer that is to be output first from the 3D printer is transmitted (S360). An index of the corresponding layer or an ID of the corresponding sub-control command is stored to check the current output position (S365).

If an output task of the 3D printer is being performed, an index of a layer being currently output, or an ID of a sub-control command corresponding to the layer, is checked (S355). Thereafter, a sub-control command corresponding to the following layer is transmitted to the 3D printer (S360). An index of the corresponding layer or an ID of the corresponding sub-control command is stored to track the current output position (S365). In operation S370, it is determined whether there is a sub-control command that has not been transmitted yet. If there is a sub-control command that has not been transmitted yet, operation S360 and operation 370 are repeated. If all of the sub-control commands are transmitted, the process 300 ends.

Meanwhile, if it is determined from operation S315 that an output task of the 3D printer is being performed (i.e., a request for output of at least one additional object is received when the output of a current object is in progress), a remaining space for the output task is identified (S375). Thereafter, it is determined whether the total volume of the requested one or more 3D objects is equal to or smaller than the volume of the remaining space (S380). If the total volume of the requested one or more 3D objects is smaller than the volume of the remaining space (i.e., when the at least one additional object can be accommodated in the remaining volume), one or more output files representing the requested one or more 3D objects are unified into the existing output file (S325). If there is a 3D object that is unable to be disposed in the remaining space (i.e., a determination as to whether one of the one or more additional objects cannot be accommodated in the remaining volume), an output file representing the 3D object, or a pointer to such a file, is stored in a queue (S335). The output file stored in the queue is set for output in a subsequent output task of the 3D printer. A control command is then generated based on the unified output file (S340), and the generated control command is divided into a plurality of per-layer sub-control commands. An index of a layer that is currently being output, or an ID of a sub-control command corresponding to the layer, is checked (S355), and with respect to layers subsequent to the layer currently being output, newly generated sub-control commands (i.e., the sub-control commands from the unified file that takes into account the one or more additional objects) are sequentially transmitted to the 3D printer instead of the existing corresponding sub-control commands (S360). Accordingly, one or more 3D objects requested during an in-progress output task are output through the output task together with the previously requested one or more 3D objects.

Figure 4:
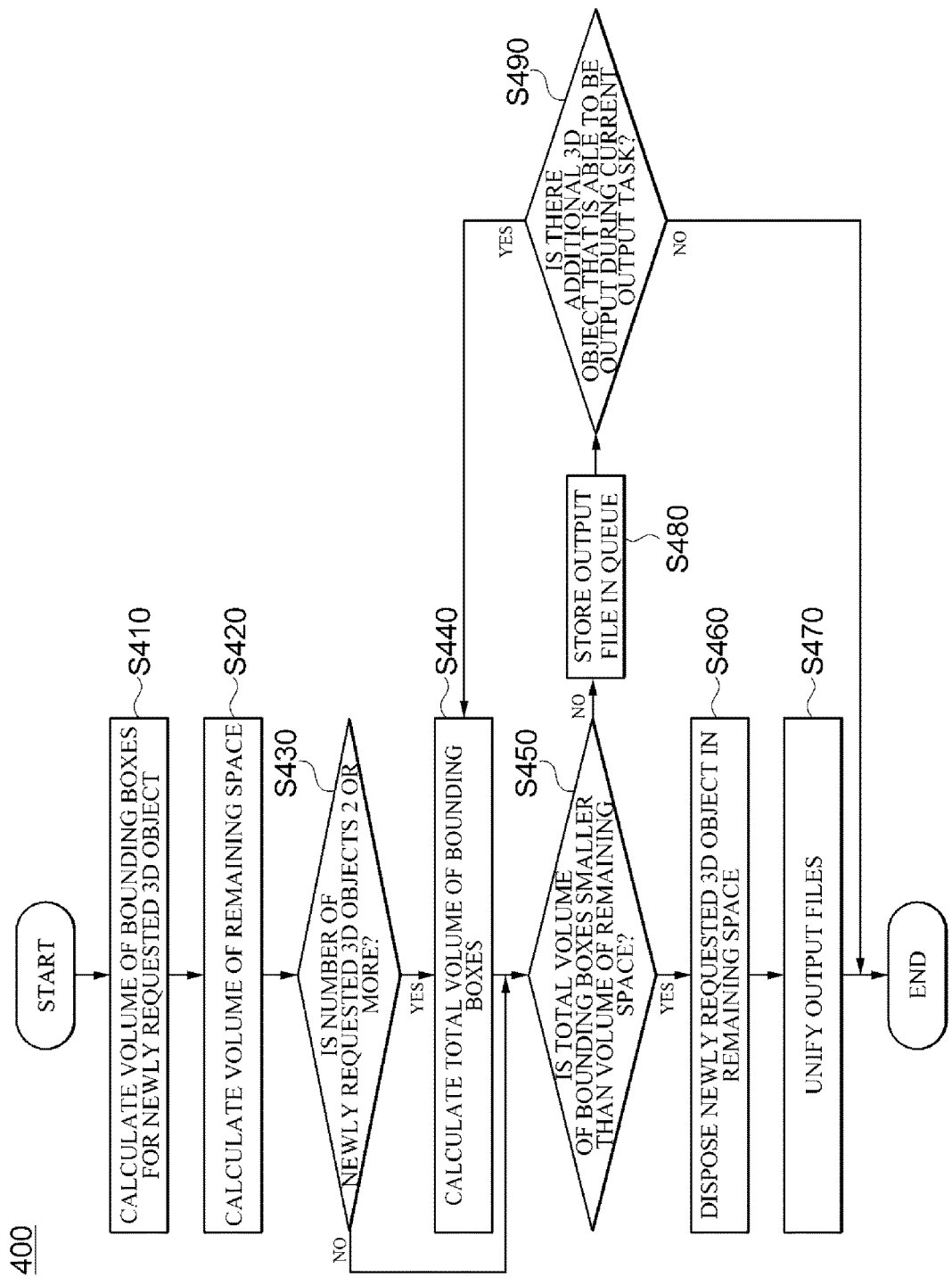
FIG. 4 is a diagram illustrating a process of disposing a newly requested 3D object together with a previously requested 3D object in a build space according to an example embodiment of the present disclosure.

FIG. 4 is a diagram illustrating a process 400 of disposing a newly requested 3D object together with a previously requested 3D object in a build space according to an example embodiment of the present disclosure. The process 400 is performed, in an example embodiment, by the apparatus 120, in particular, the output determiner 122.

In operation S410, the volume of a bounding box for a 3D object that is newly requested during an output task performed to output a previous requested 3D object by the 3D printer is calculated. A 3D model representing a 3D object is covered by one or more bounding boxes (for example, cubes). According to an example embodiment, the number of bounding boxes is set or adjusted by a user or by the apparatus 120 in advance. In particular, the number of bounding boxes is adjusted for spatial efficiency. According to another example embodiment, the number of bounding boxes is adjusted for calculation efficiency. According to example embodiments of the present disclosure, when a plurality of bounding boxes surround a single 3D model, the 3D printer outputs the 3D object represented by the 3D model divided into a plurality of portions.

In operation S420, within a build space of the 3D printer that is performing an output task, a remaining space for the output task is identified, and the volume of the remaining space is calculated. For convenience of description, it is assumed that the build space has a cubic shape on a print bed of the 3D printer. The volume of the remaining space R is calculated as in Equation 1 shown below.

$$R = \{P_L \times P_W \times (P_H - P_Z)\} - \left\{\sum_{b=1}^{n} \sum_{i=1}^{m} B_{L_i} \times b_{W_i} - (b_{Z_i} - P_Z)\right\} \quad \text{[Equation 1]}$$

Herein, $P_L$ is the length of the build space, $P_W$ is the width of the build space, $P_H$ is the height of the build space, $P_Z$ is a current coordinate value on the Z axis along which a head of the 3D printer moves (that is, a Z-axis coordinate value of a layer currently being output), n is the number of previously requested 3D objects, m is the number of bounding boxes for each of the previously requested 3D objects, $b_{Li}$ is the length of each bounding box, $b_{Wi}$ is the width of each bounding box, and $b_{Zi}$ is the maximum Z-axis coordinate value of bounding boxes in the build space (if $b_{Zi} \leq P_Z$, $b_{Zi} - P_Z = 0$).

In operation S430, it is determined whether the number of newly requested 3D objects is equal to or greater than 2. If the number of newly requested objects is 1, the bounding box volume of the 3D object is compared with the volume of the remaining space R (S450). If the number of newly requested objects is equal to or greater than 2, the total volume of the bounding boxes of the newly requested 3D objects is calculated (S440), and the calculated total volume is compared with the volume of the remaining space R (S450).

If the total volume of the bounding boxes is equal to or smaller than the volume of the remaining space R, the newly requested one or more 3D objects are disposed in the remaining space (S460). The 3D object is, in example embodiments, rotated or divided into several portions and then disposed in the remaining space.

Figure 5:
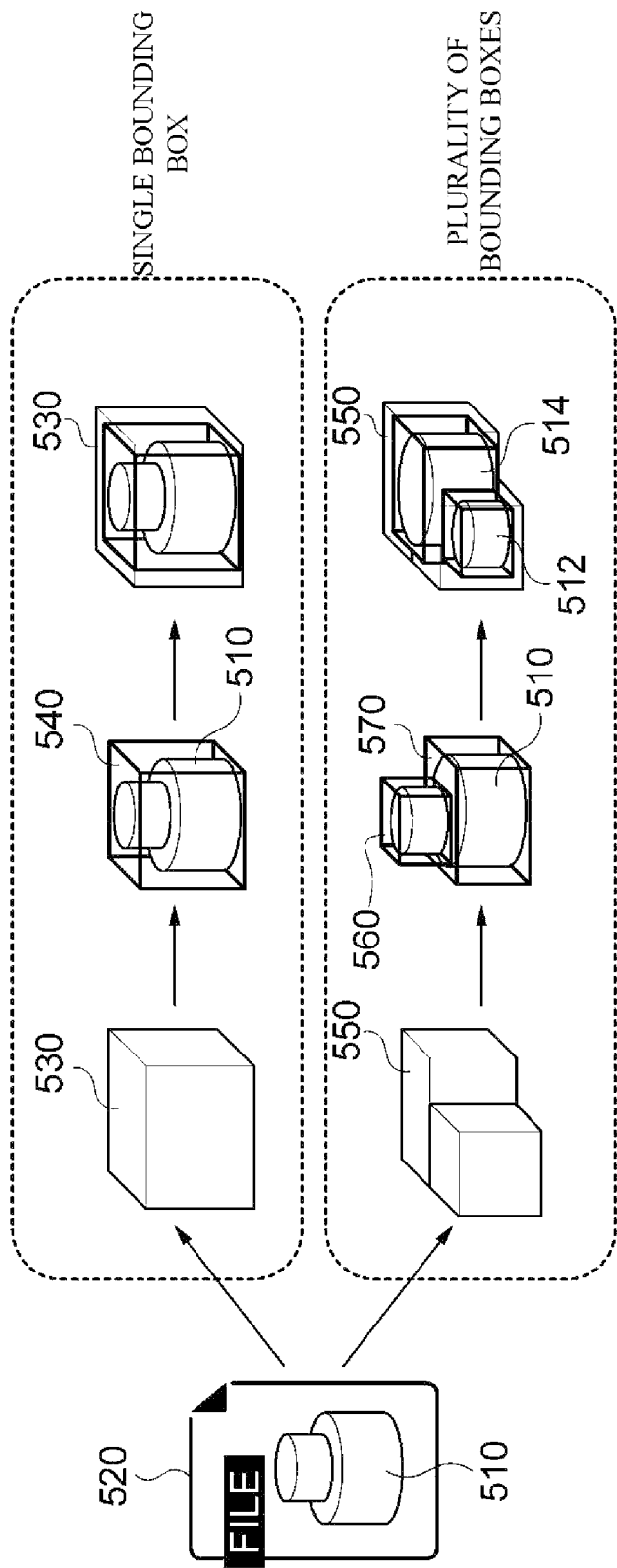
FIG. 5 is a diagram illustrating a process of disposing a 3D object in a remaining space according to an example embodiment of the present disclosure.

Referring to FIG. 5, a user requests output of a 3D object 510 by selecting an output file 520 representing the 3D object 510 during an output task of a 3D printer. For example, when a remaining space 530 is identified according to such a request, a single bounding box 540 is set. The 3D object 510 is disposed in the remaining space 530 as shown in FIG. 5. As another example, when a remaining space 550 is identified (as illustrated, the space 550 is shorter than space 530), two bounding boxes 560 and 570 are set. The 3D object 510 is divided into portions to fit in the remaining space 550 and disposed in the remaining space 550 as shown in FIG. 5. The 3D object 510 is output in portions 512 and 514 that are later combined through post-processing, and thereby returned to the original shape of the 3D object 510.

In operation S470, a single output file for outputting the previously requested 3D object is unified with an output file for outputting the newly requested 3D object. The unified output file is used to generate a new control command (i.e., to generate the control command to control output instead of the file prior to unification).

If the total volume of bounding boxes is larger than the volume of the remaining space, and the number of newly requested 3D objects is 1, an output file for outputting the newly requested 3D object is stored in a queue (S480). If the total volume of bounding boxes is larger than the volume of the remaining space, and the number of newly requested 3D objects is 2 or more, an output file for one of the newly requested 3D objects is stored in a queue (S480), and the total bounding box volume is calculated with respect to the remaining 3D objects (S440). The calculated total bounding box volume is compared with the volume of the remaining space R again (S450). If the total bounding box volume will fit within the volume of the remaining space, operation S460 and operation S470 are repeated. Alternatively, operation S460 and operation S470 are repeated when the current state of the 3D printer (for example, the amount of remaining printing material) is suitable for additional output and the total bounding box volume is equal to or smaller than the volume of the remaining space. If it is determined that all output files of newly requested 3D objects are stored in a queue, and there is no additional 3D object that is able to be output during the current output task (S490), the process 400 ends and no additional objects are added to the currently executing output task. The output files stored in the queue are set for output in a subsequent or later output task of the 3D printer.

Hereinafter, computing environments according to example embodiments of the present disclosure in which the 3D printing system 100 is implemented will be described with reference to FIGS. 6 and 7.

Figure 6:
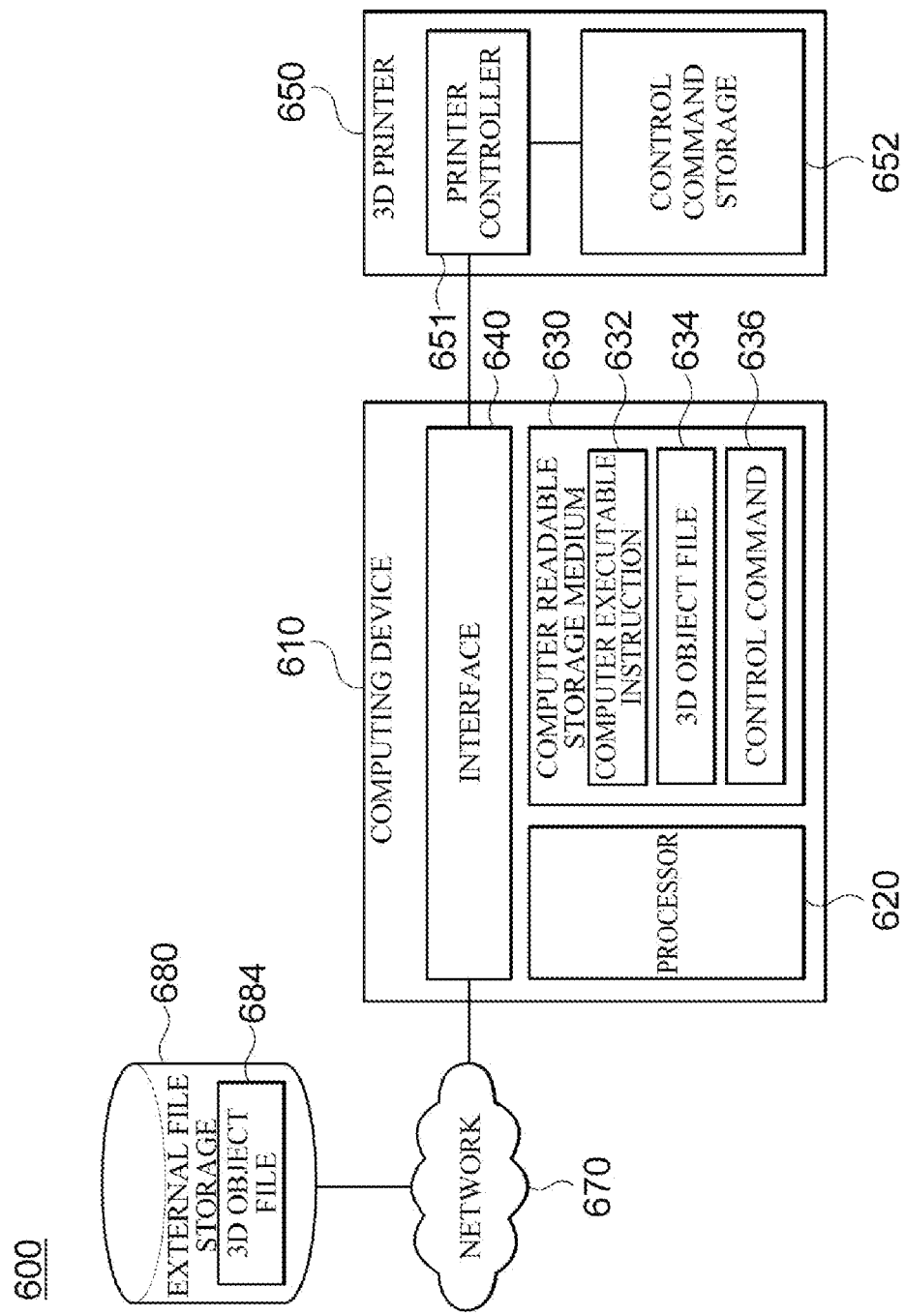
FIG. 6 is a diagram illustrating a computing environment according to an example embodiment of the present disclosure that is suitable for implementing a 3D printing system.

FIG. 6 is a diagram illustrating a computing environment according to an example embodiment of the present disclosure that is suitable for implementing a 3D printing system.

Referring to FIG. 6, a computing environment 600 includes a computing device 610, such as a host computer, connected to a 3D printer 650.

The computing device 610 includes one or more hardware processors 620 and a computer readable storage medium 630, such as a memory, that is able to be accessed by the processor 620. The computer readable storage medium 630 is disposed inside or outside the processor 620 in accordance with example embodiments, and is connected to the processor 620 through various generally known schemes. The computing device 610 includes one or more interfaces 640. The computing device 610 is connected to one or more external devices (for example, an external file storage 680 and the 3D printer 650) through the interface 640, and is configured to support an input/output operation and/or communication between the computing device 610 and the external device.

The computer readable storage medium 630 stores a computer executable instruction 632. The processor 620 executes the instruction 632 stored in the computer readable storage medium 630. The execution of the instruction 632 by the processor 620 allows the computing device 610 to perform operations according to the example embodiments of the present disclosure. For example, when the instruction 632 is executed by the processor 620, the processor 620 is enabled to perform operations of the apparatus 120. Accordingly, a 3D object file 634 stored in the computer readable storage medium 630 and/or a 3D object file 684 stored in the external file storage 680 connected to the computing device 610 through a network 670 is converted to a control command 636 to control an output task of the 3D printer 650. The control command 636 is stored in the computer readable storage medium 630, transmitted to the 3D printer 650, and then stored in a control command storage 652. The 3D printer 650 includes a printer controller 651 and the control command storage 652. The printer controller 651 and the control command storage 652 operate in the same manner as the printer controller 131 and the control command storage 132 described above. Accordingly, the 3D printer 650 performs 3D printing according to the control command generated by the computing device 610.

Figure 7:
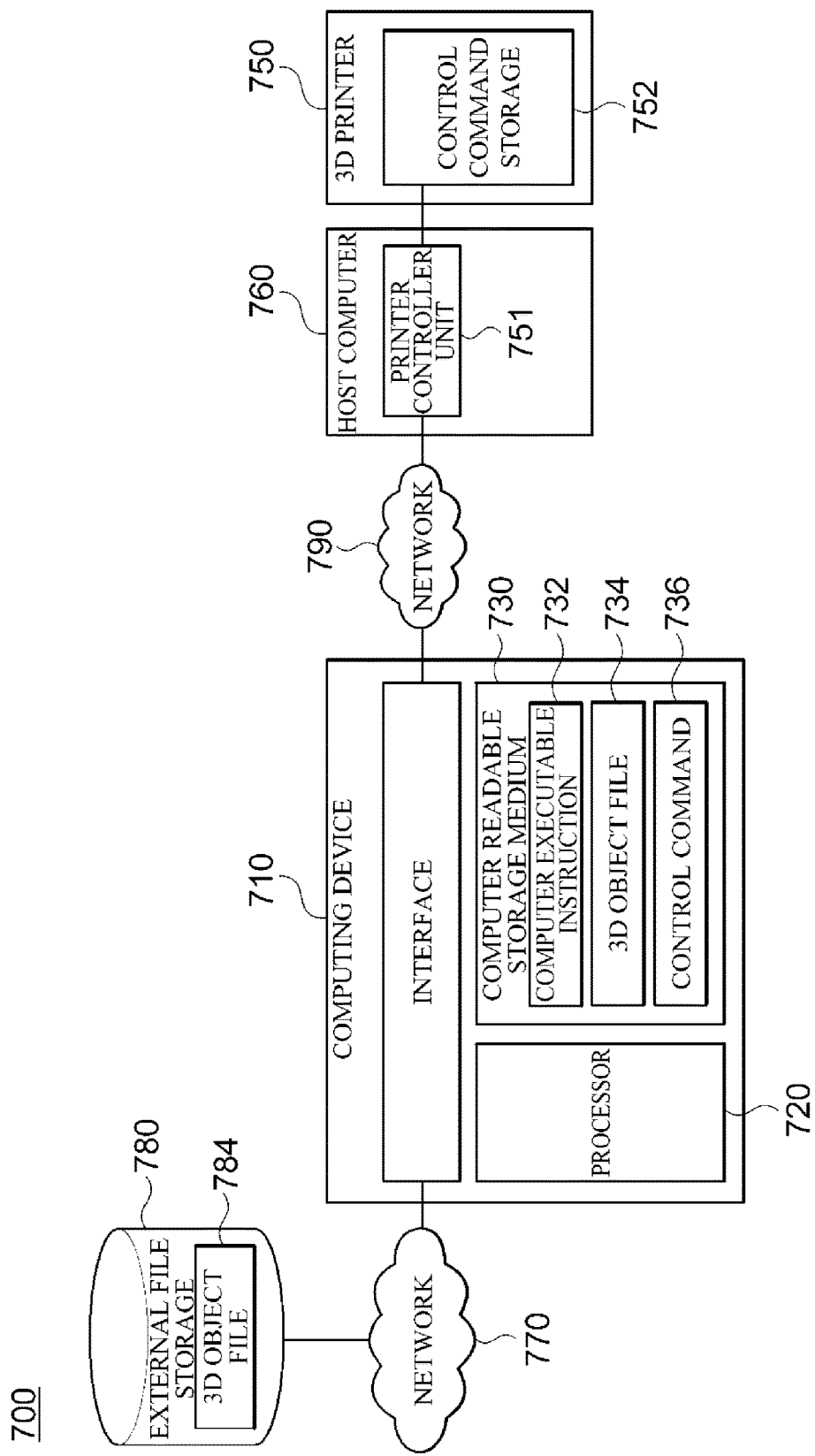
FIG. 7 is a diagram illustrating a computing environment according to an example embodiment of the present disclosure that is suitable for implementing a 3D printing system.

FIG. 7 is a diagram illustrating a computing environment according to another example embodiment of the present disclosure that is suitable for implementing a 3D printing system.

Referring to FIG. 7, a computing environment 700 according to an example embodiment of the present disclosure includes a host computer 760 connected to a 3D printer 750, and a computing device 710 connected to the host computer 760 through a network 790. In particular, the computing environment 700 is applied to a streaming-based 3D printing system that outputs a 3D object using the 3D printer 750 located in a remote area, without having to transmit 3D object files 634 and 684.

The computing device 710 includes one or more processors 720 and a computer readable storage medium 730, such as a memory, that is able to be accessed by the processor 720. The computer readable storage medium 730 is disposed inside or outside the processor 720, and is connected to the processor 720 through various generally known schemes. The computing device 710 includes one or more interfaces 740. The computing device 710 is connected to one or more external devices (for example, an external file storage 780 and the host computer 760) through the interface 740, and is configured to support an input/output operation and/or communication between the computing device 710 and the external device.

The computer readable storage medium 730 stores a computer executable instruction 732. The processor 720 executes the instruction 732 stored in the computer readable storage medium 730. The execution of the instruction 732 by the processor 720 allows the computing device 710 to perform operations according to the example embodiments of the present disclosure. For example, when the instruction 732 is executed by the processor 720, the processor 720 is allowed to perform operations of the apparatus 120. Accordingly, a 3D object file 734 stored in the computer readable storage medium 730 and/or a 3D object file 784 stored in the external file storage 780 connected to the computing device 710 through a network 770 is converted to a control command 736 to control an output task of the 3D printer 750. The control command 736 is stored in the computer readable storage medium 730, transmitted to the 3D printer 750, and then stored in a control command storage 752.

According to example embodiments of the present disclosure, the 3D printer 750 includes the control command storage 752, and a printer controller 751 is included in the host computer 760. According to example embodiments of the present disclosure, the printer controller 751 and the control command storage 752 are included in the 3D printer 750. In either case, the printer controller 751 and the control command storage 752 operate in the same manner as the printer controller 131 and the control command storage 132 described above. Accordingly, the 3D printer 750 performs 3D printing according to the control command generated by the computing device 710.

Meanwhile, an example embodiment of the present disclosure includes a computer readable storage medium including a program that is configured to perform the above described process in the specification on a computer. The computer readable recording medium is provided in a program instruction, a local data file, a local data structure, or in a combination of one or more of these. The computer readable storage medium is designed and constructed specifically for the operations described in the present disclosure. Examples of the computer readable recording medium include hardware devices constructed to store and execute program instructions, for example, non-transitory media such as magnetic hard disks, floppy disks, and tapes, optical media such as CD-ROMs and DVDs, magneto-optical media such as floptical discs, read-only memories (ROM), random access memories (RAM), and flash memories. According to an example embodiment, the computer readable recording medium includes transitory media such as a download carried over a network or the like. In addition, the program instruction includes a machine code made by a compiler, and a high-level language executable by a computer through an interpreter. According to another example embodiment of the present disclosure, a computer program for executing the above described processes in the specification is provided. The program is stored in the computer readable storage medium to execute the above described process in combination with hardware. The program instruction, in an example embodiment, is part of a printer driver of the 3D printer.

As is apparent from the above, when a new 3D object is requested during an output task of outputting a 3D object, the newly requested 3D object can also be output during the current output task.

A control command to control the 3D printer is generated, and the control command is processed in units of printing material layers, so that the output task can be precisely controlled.

The 3D printer can output more 3D objects less, thereby improving the productivity of the 3D printer.

It will be apparent to those skilled in the art that various modifications can be made to the above-described example embodiments of the present disclosure without departing from the spirit or scope of the disclosure. Thus, it is intended that the present disclosure cover all such modifications provided they come within the scope of the appended claims and their equivalents.

What is claimed is:

1. An apparatus, intended for use in controlling three dimensional (3D) printing, comprising:
an output determiner, implemented by one or more hardware processors, configured to make an additional output determination, after generating a first control command to output a first 3D object within a build space of a 3D printer as part of a current output task, as to whether a second 3D object can be output within a remaining space of the build space as part of the current output task; and
a control command generator, implemented by the one or more hardware processors, configured to generate a second control command to output a not-yet-output part of the first 3D object and the second 3D object when the additional output determination is affirmative,
wherein the output determiner is further configured to make the additional output determination based on first modeling information about the first 3D object and second modeling information about the second 3D object,
wherein the first 3D object is output within the build space of the 3D printer in accordance with the current output task, and
wherein the output determiner is further configured to identify a shape of the remaining space for the current output task, within the build space, based on the first modeling information, and to base the additional output determination at least in part on a remaining space determination as to whether the second 3D object can be fit into the shape of the remaining space.

2. The apparatus of claim 1, wherein:
the output determiner is further configured to obtain the first modeling information based on a first user request for the first 3D object before initiating the current output task; and
the control command generator is configured to generate the first control command based on the first modeling information.

3. The apparatus of claim 2, wherein:
the first control command includes first per-layer sub-control commands adapted to cause a 3D printer to output the first 3D object by stacking a material; and
the second control command includes second per-layer sub-control commands adapted to cause the 3D printer to output the not-yet-output part of the first 3D object and the second 3D object by stacking the material.

4. The apparatus of claim 3, further comprising a control command transmitter, implemented by the one or more hardware processors, configured to sequentially transmit the first per-layer sub-control commands to the 3D printer to effect the current output task, and to stop sequentially transmitting the first per-layer sub-control commands when transmitting the second per-layer sub-control commands.

5. The apparatus of claim 1, wherein when the additional output determination is affirmative, the output determiner is further configured to make another additional output determination with respect to whether a third 3D object can be included as part of the current output task for the first 3D object and the second 3D object.

6. The apparatus of claim 1, wherein:
the output determiner is further configured such that, when the additional output determination is affirmative, the output determiner generates unified modeling information based on the first modeling information and the second modeling information; and
the control command generator is further configured to generate the second control command based on the unified modeling information.

7. The apparatus of claim 1, wherein the output determiner is further configured make the remaining space determination taking into account a total volume of one or more bounding boxes covering the second 3D object, based on the second modeling information, and a volume of the remaining space, and when the total volume of the one or more bounding boxes is smaller than the volume of the remaining space, the remaining space determination is affirmative.

8. The apparatus of claim 6, wherein the unified modeling information represents both the not-yet-output part of the first 3D object in the build space and the second 3D object in the remaining space.

9. The apparatus of claim 6, wherein the first modeling information, the second modeling information, and the unified modeling information are each provided as separate output files in a common 3D print format.

10. The apparatus of claim 1, wherein the output determiner is further configured to store the second modeling information in a queue for output in an output task subsequent to the current output task when the additional output determination is not affirmative.

11. The apparatus of claim 1, further comprising a control command transmitter, implemented by the one or more hardware processors, configured to transmit the second control command during the current output task, instead of the first control command.

12. The apparatus of claim 1, further comprising a printer monitor, implemented by the one or more hardware processors, configured to obtain status information about a 3D printer performing the current output task, and to transmit the status information to the output determiner, wherein the output determiner is further configured to detect whether the current output task is in progress based on the status information, and to make the additional output determination after it is detected that the current output task is in progress.

13. A method of controlling three dimensional (3D) printing, comprising:
making an additional output determination, after generating a first control command to output a first 3D object within a build space of a 3D printer as part of a current output task, as to whether a second 3D object can be output within a remaining space of the build space as part of the current output task; and
generating a second control command to output a not-yet-output part of the first 3D object and the second 3D object when the additional output determination is affirmative;
wherein the making of the additional output determination and the generating of the second control command are implemented using one or more hardware processors,
wherein the making of the additional output determination is based on first modeling information about the first 3D object and second modeling information about the second 3D object, and
wherein the method further comprises:
outputting the first 3D object within the build space of a 3D printer in accordance with the current output task;
identifying a shape of the remaining space for the current output task, within the build space, based on the first modeling information; and
basing the additional output determination at least in part on a remaining space determination as to whether the second 3D object can be fit into the shape of the remaining space.

14. The method of claim 13, further comprising:
obtaining the first modeling information based on a first user request for the first 3D object before initiating the current output task; and
generating the first control command based on the first modeling information.

15. The method of claim 14, wherein:
the first control command includes first per-layer sub-control commands adapted to cause a 3D printer to output the first 3D object by stacking a material; and
the second control command includes second per-layer sub-control commands adapted to cause the 3D printer to output the not-yet-output part of the first 3D object and the second 3D object by stacking the material.

16. The method of claim 15, further comprising:
sequentially transmitting the first per-layer sub-control commands to the 3D printer to effect the current output task; and
stopping sequentially transmitting the first per-layer sub-control commands when transmitting the second per-layer sub-control commands.

17. The method of claim 13, further comprising, when the additional output determination is affirmative, making another additional output determination with respect to whether a third 3D object can be included as part of the current output task for the first 3D object and the second 3D object.

18. The method of claim 13, further comprising, when the additional output determination is affirmative, generating unified modeling information based on the first modeling information and the second modeling information, and generating the second control command based on the unified modeling information.

19. The method of claim 13, further comprising making the remaining space determination taking into account:
a total volume of one or more bounding boxes covering the second 3D object, calculated based on the second modeling information; and
a comparison of the total volume of the one or more bounding boxes with a volume of the remaining space;
wherein when the total volume of the one or more bounding boxes is smaller than the volume of the remaining space, the remaining space determination is affirmative.

20. The method of claim 18, wherein the unified modeling information represents the not-yet-output part in the build space and the second 3D object in the remaining space.

21. The method of claim 18, wherein the first modeling information, the second modeling information, and the unified modeling information are each provided as separate output files in a common 3D print format.

22. The method of claim 13, further comprising storing the second modeling information in a queue for output in an output task subsequent to the current output task when the additional output determination is not affirmative.

23. The method of claim 13, further comprising transmitting, during the current output task, the second control command instead of the first control command.

24. The method of claim 13, further comprising:
obtaining status information about a 3D printer performing the current output task;
detecting whether the current output task is in progress based on the status information; and
making the additional output determination after detecting that the current output task is in progress.

25. A computer program product comprising a non-transitory computer readable medium and program instructions adapted to enable a hardware processor to implement operations including:
making an additional output determination, after generating a first control command to output a first 3D object within a build space of a 3D printer as part of a current output task, as to whether a second 3D object can be output within a remaining space of the build space as part of the current output task; and generating a second control command to output a not-yet-output part of the first 3D object and the second 3D object when the additional output determination is affirmative, wherein the making of the additional output determination is based on first modeling information about the first 3D object and second modeling information about the second 3D object, and wherein the method further comprises:
  outputting the first 3D object within the build space of a 3D printer in accordance with the current output task;
  identifying a shape of the remaining space for the current output task, within the build space, based on the first modeling information; and
  basing the additional output determination at least in part on a remaining space determination as to whether the second 3D object can be fit into the shape of the remaining space.

* * * * *